(12) United States Patent
Chien

(10) Patent No.: US 10,066,798 B2
(45) Date of Patent: Sep. 4, 2018

(54) INTERCHANGE UNIVERSAL KITS FOR LED LIGHT DEVICE

(76) Inventor: Tseng-Lu Chien, Shi-Chi Town (TW)

( * ) Notice: Subject to any disclaimer, the term of this patent is extended or adjusted under 35 U.S.C. 154(b) by 0 days.

(21) Appl. No.: 13/295,562

(22) Filed: Nov. 14, 2011

(65) Prior Publication Data

US 2012/0057370 A1    Mar. 8, 2012

Related U.S. Application Data

(63) Continuation of application No. 12/622,000, filed on Nov. 19, 2009, now Pat. No. 8,434,927.

(51) Int. Cl.

| | |
|---|---|
| *F21S 8/00* | (2006.01) |
| *F21S 9/02* | (2006.01) |
| *F21V 21/08* | (2006.01) |
| *F21V 21/14* | (2006.01) |
| *F21V 21/22* | (2006.01) |
| *F21V 17/02* | (2006.01) |
| *F21V 33/00* | (2006.01) |
| *G02F 1/13* | (2006.01) |
| *G03B 21/20* | (2006.01) |

(Continued)

(52) U.S. Cl.
CPC ............. *F21S 8/035* (2013.01); *F21K 9/232* (2016.08); *F21S 4/28* (2016.01); *F21S 9/02* (2013.01); *F21S 10/002* (2013.01); *F21S 10/007* (2013.01); *F21V 5/04* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/08* (2013.01); *F21V 21/14* (2013.01); *F21V 21/22* (2013.01); *F21V 23/00* (2013.01); *F21V 23/04* (2013.01); *F21V 29/00* (2013.01); *F21V 33/0052* (2013.01); *G02F 1/1313* (2013.01); *G03B 21/2046* (2013.01); *G03B 23/00* (2013.01); *F21V 21/29* (2013.01); *F21V 21/30* (2013.01); *F21V 23/0442* (2013.01); *F21V 23/0471* (2013.01); *F21W 2121/00* (2013.01); *F21Y 2101/00* (2013.01); *F21Y 2115/10* (2016.08); *G03B 21/142* (2013.01); *Y10S 362/80* (2013.01); *Y10S 362/806* (2013.01)

(58) Field of Classification Search
CPC .. F21S 8/035; F21Y 2101/02; F21V 23/0442; F21V 9/08; F21V 23/04
USPC .......................................... 362/641, 644, 645
See application file for complete search history.

(56) References Cited

U.S. PATENT DOCUMENTS

| | | | | |
|---|---|---|---|---|
| 3,393,310 | A | * | 7/1968 | Ream ...................... F21S 8/035 353/4 |
| 4,912,609 | A | * | 3/1990 | Gillette ........................ 362/147 |

(Continued)

*Primary Examiner* — Julie Bannan
(74) *Attorney, Agent, or Firm* — Bacon & Thomas, PLLC

(57) ABSTRACT

An interchangeable power source light device has an AC power sealed-unit that fits into a uniform compartment of the light device housing. The AC power sealed-unit can be replaced by a DC power battery-pack, which also fits into the uniform compartment-means of the light device housing. The light device may have a built-in light source within the housing for connection with the sealed-unit or battery unit by to deliver electric signals from the sealed-unit or battery pack to the light source. Each sealed-unit and battery pack not only has its own power source, but also circuitry and a trigger, and optionally other light source(s) having low power consumption such as an LED(s), electro-luminescent (EL) element, organic LED, or organic EL element.

11 Claims, 8 Drawing Sheets

(51) Int. Cl.
*G03B 23/00* (2006.01)
*F21V 14/00* (2018.01)
*F21S 10/00* (2006.01)
*F21V 5/04* (2006.01)
*F21V 23/00* (2015.01)
*F21S 4/28* (2016.01)
*F21V 13/02* (2006.01)
*F21V 14/06* (2006.01)
*F21V 14/08* (2006.01)
*F21V 29/00* (2015.01)
*F21K 9/232* (2016.01)
*F21V 21/30* (2006.01)
*F21V 23/04* (2006.01)
*F21W 121/00* (2006.01)
*G03B 21/14* (2006.01)
*F21V 21/29* (2006.01)
*F21Y 101/00* (2016.01)
*F21Y 115/10* (2016.01)

(56) References Cited

U.S. PATENT DOCUMENTS

| | | | | |
|---|---|---|---|---|
| 5,517,264 | A * | 5/1996 | Sutton | 353/119 |
| 6,629,770 | B2 * | 10/2003 | Blatherwick | 362/363 |
| 6,709,132 | B2 * | 3/2004 | Ishibashi | 362/235 |
| 7,438,446 | B1 * | 10/2008 | McCann | F21S 8/035 |
| | | | | 362/341 |
| 2002/0181234 | A1 * | 12/2002 | Kawahara | 362/257 |
| 2003/0086266 | A1 * | 5/2003 | Leen | 362/276 |
| 2004/0246704 | A1 * | 12/2004 | Burdick | 362/95 |
| 2005/0117343 | A1 * | 6/2005 | Leifer | F21S 8/035 |
| | | | | 362/276 |
| 2005/0226006 | A1 * | 10/2005 | Chen | 362/641 |
| 2006/0062019 | A1 * | 3/2006 | Young | 362/641 |
| 2007/0109813 | A1 * | 5/2007 | Copeland et al. | 362/641 |
| 2008/0080187 | A1 * | 4/2008 | Purinton | F21K 9/00 |
| | | | | 362/294 |

* cited by examiner

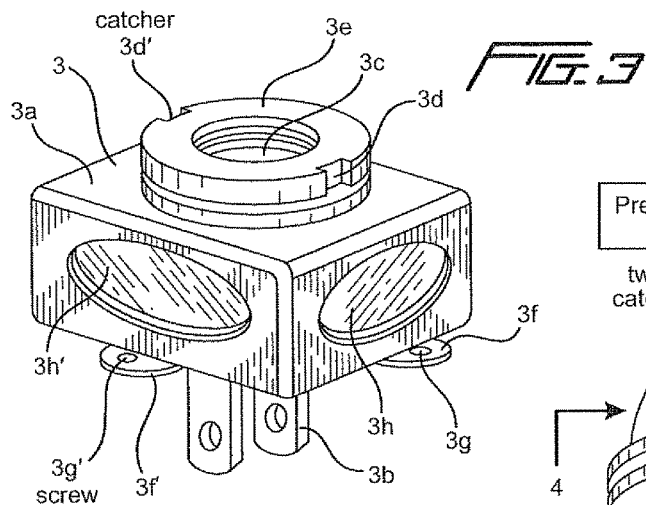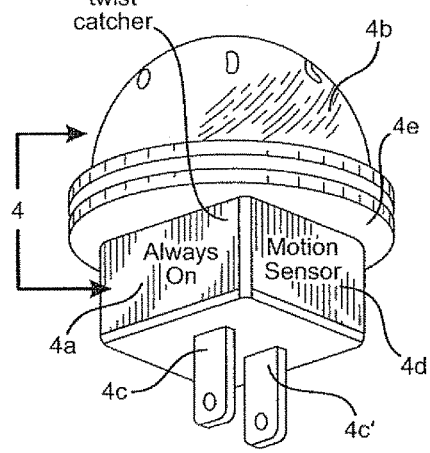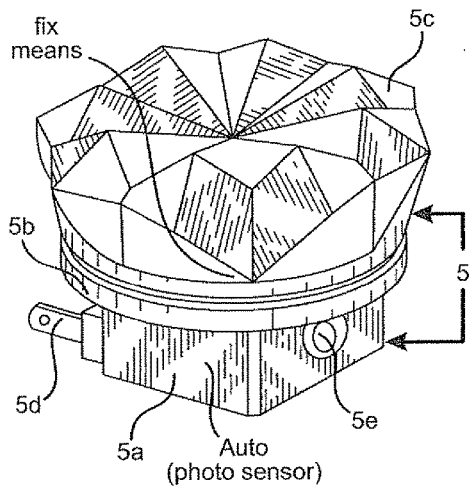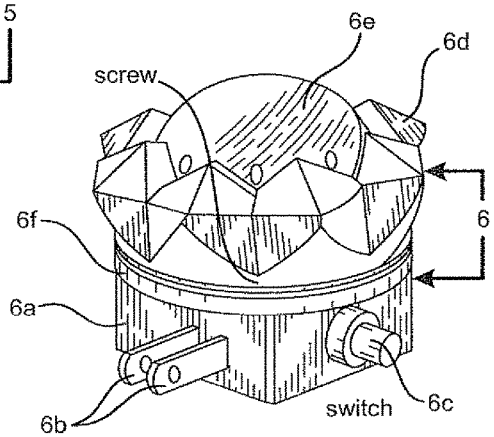

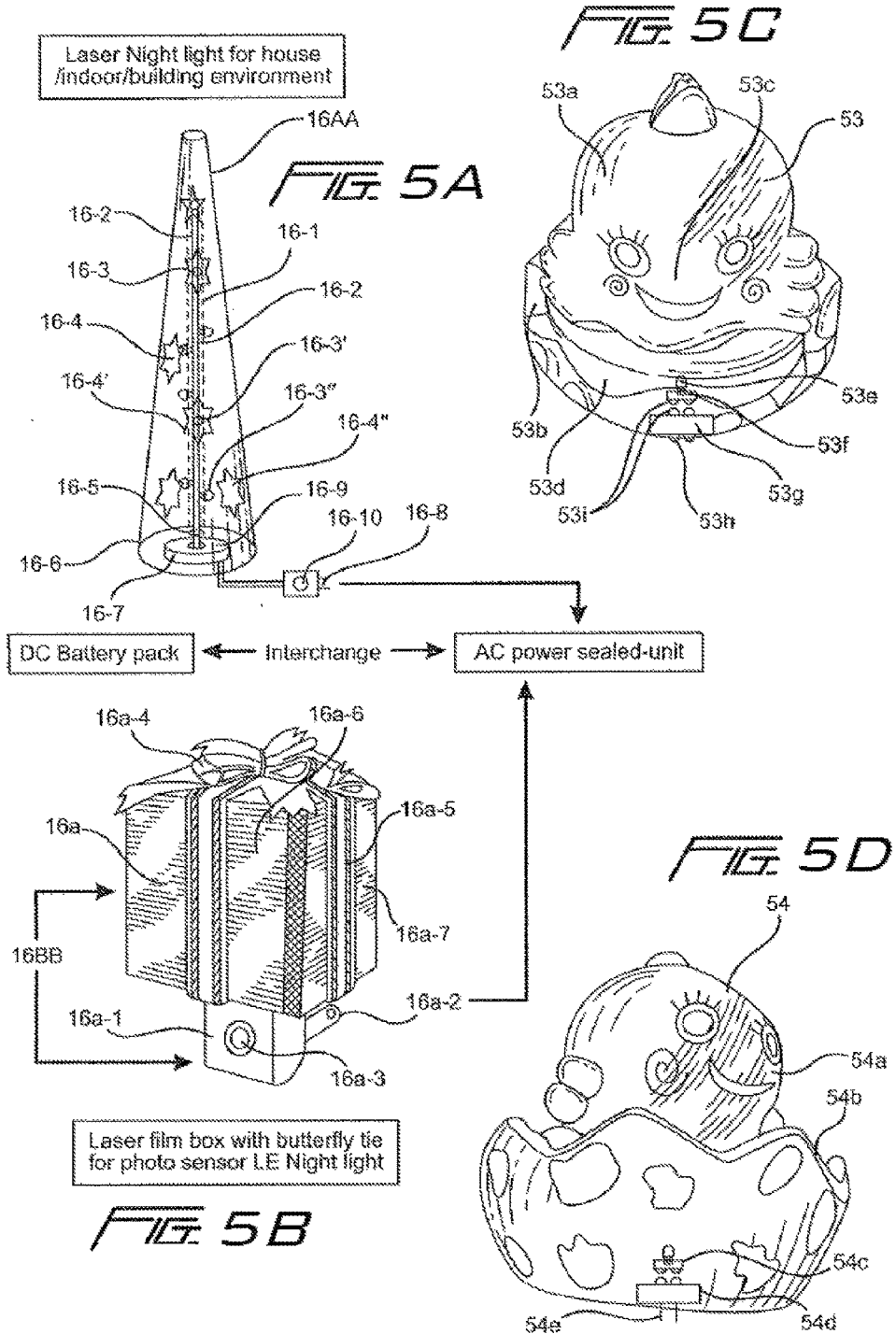

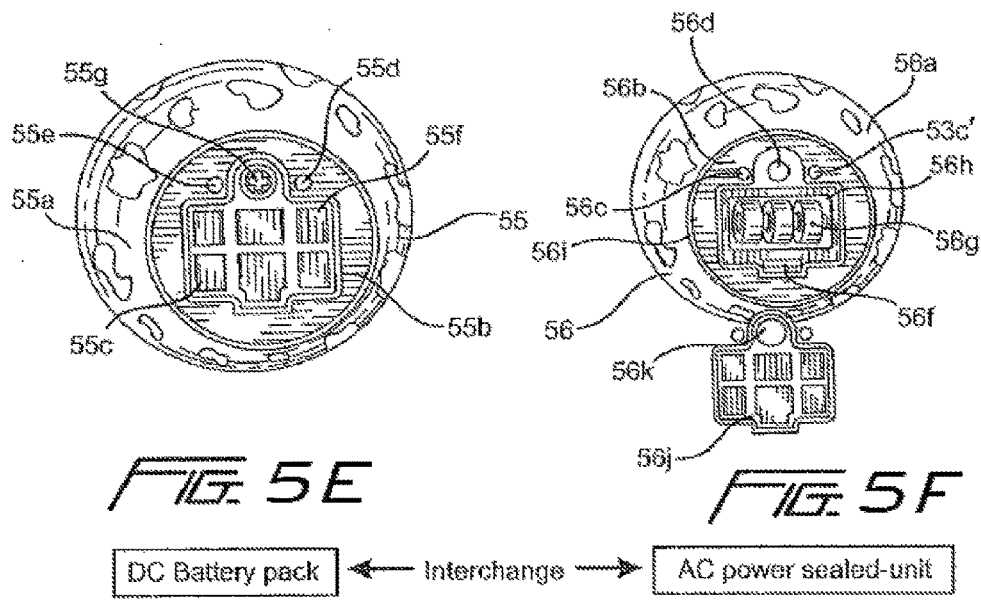
DC Battery pack ← Interchange → AC power sealed-unit
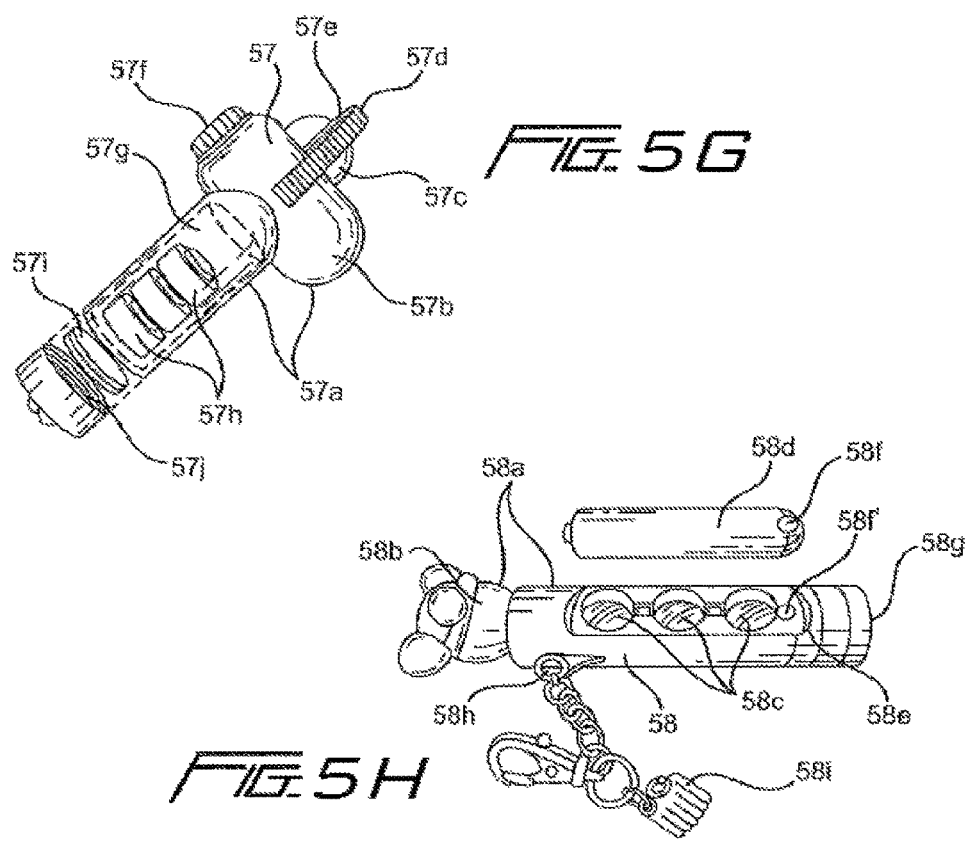

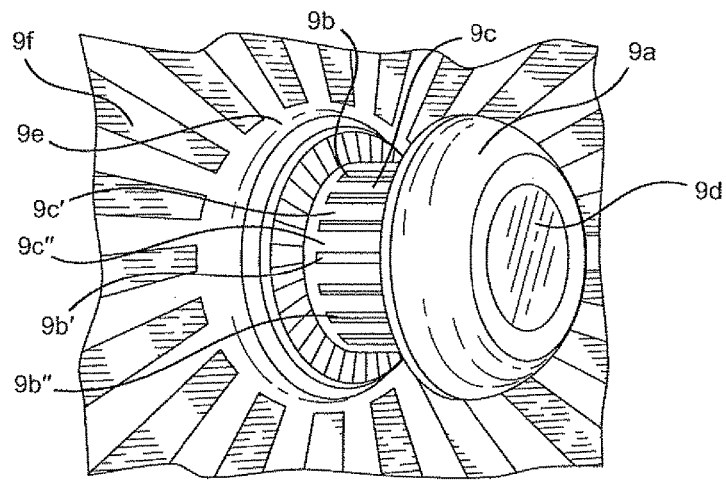
FIG. 9
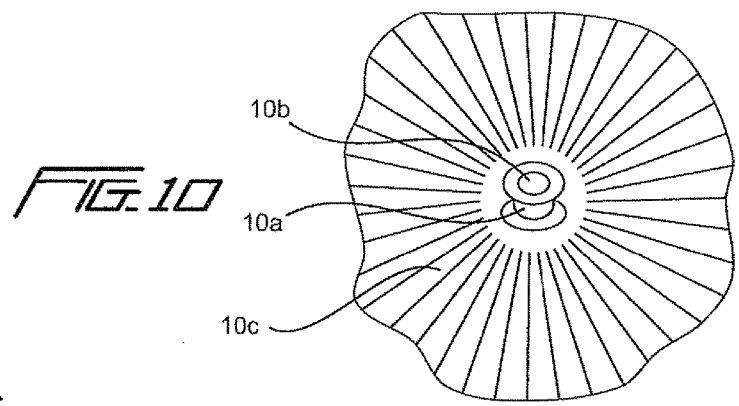
FIG. 10
FIG. 15
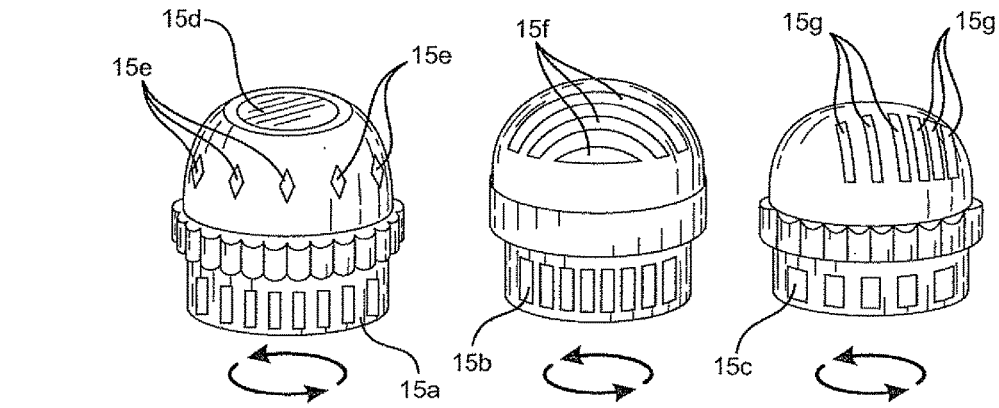

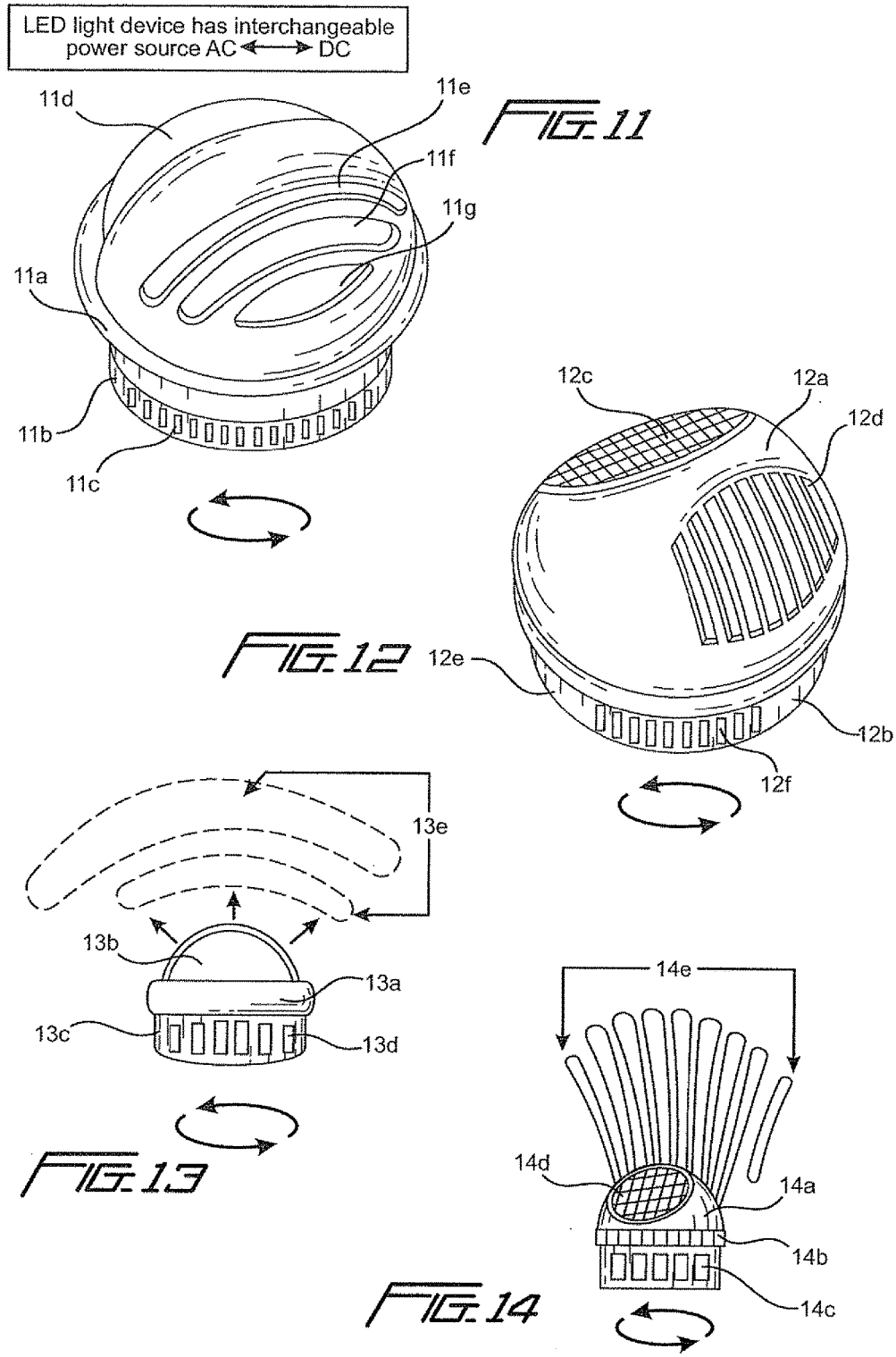

INTERCHANGE UNIVERSAL KITS FOR LED LIGHT DEVICE

This application is a division of U.S. patent application Ser. No. 12/622,000, filed Nov. 19, 2001.

BACKGROUND OF THE INVENTION

This application has subject matter in common with the inventor's U.S. patent application Ser. No. 12/318,473 ("LED night light with laser or hologram elements"); Ser. No. 12/318,470 ("LED projection night light"); Ser. No. 12/318,471 ("LED light has pinhole-imaging"); Ser. No. 12/292,153 ("LED night light has projection or image feature"); Ser. No. 12/232,505 ("LED night light with Projection features"); Ser. No. 12/149,963 ("Removable LED light device"); Ser. No. 12/073,889 ("LED track light device"); Ser. No. 12/073,095 ("LED light with changeable position with Preferable power source"); Ser. No. 12/007,076 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 11/527,631 ("Night light with interchangeable display unit"); Ser. No. 11/498,881 ("Poly Night light"); Ser. No. 11/255,981 ("Multiple light source Night Light"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function"); and Ser. No. 11/806,711 ("Multiple LEDs Light with adjustable angle function").

Of the above, U.S. patent application Ser. Nos. 11/527,631; 11/498,881; 11/255,981; 11/094,215; 12/318,470; 12/318,471; and 12/318,473 all disclose an "AC power sealed-unit" and "DC powered battery-pack" that are interchangeable with each other to fit into a "uniform compartment" on the LED light housing. The current invention also involves an interchangeable sealed AC unit and a DC battery pack, for all kinds of applications that may include an LED, such as a toy, gift, game, lighting, camping light, car, miniature cars, sound device, video device, music device, or touch device. However, the current invention differs from the inventions of the seven applications that also disclose sealed units in the following respects:

(1) Light Source:
The earlier filings are limited to an LED as light source. The current invention covers all low power consumption light elements, including electro-luminescent elements as well as LEDs, as the light source.

(2) Light Source within Current Light Device for Common Use:
The current light source may be common to both the sealed-unit and battery-pack so that there is no need for the sealed-unit and battery-pack to each have its own light source. The earlier applications of the inventor each disclose a sealed-unit and battery-pack having its own LED within its own housing.

(3) Light Source Definition:
The light sources of the current invention can all be turned on by DC electric signals supplied by only three relatively low voltage fresh batteries (such as three Duracell™ alkaline AA batteries) to provide a light performance that last more than one hour.

In addition, the sealed unit or battery pack of the current invention offers the further improvement that it has its own trigger means, which may include any of a push switch, slide switch, conductive switch, sensor, motion sensor, vibration switch, tilt switch, heat switch, moisture switch or any mechanic or electric switch available from the convention market and that can be selected to use for a DC powered battery light device.

The current invention has wide application for any DC powered battery items capable of providing a "compartment with uniform connect-means," because is easy to design the "AC powered sealed-unit" and "DC power battery-pack" with the above discussed trigger means to fit each of the existing battery powered application listed above so that any such battery powered application can be converted to an AC powered lighting device by replacing the battery pack with an "AC powered sealed-unit" that can be plugged into wall outlet. This will let people buy one battery-powered application and yet make use of two different power sources for different location requirements. For example, one could buy a bathroom floating LED battery operated toy light that can be changed into an AC powered LED night light to plug into a wall outlet and become a very cute and eye-catching device. If people think such a device is too toy like, fine—one could instead change the kids' battery powered LED flash light to an AC powered flashing light to plug into a wall for night time illumination, which is more similar to a conventional market night light.

The current invention can also, conversely, change a safety AC powered light device into a DC powered battery light device by simply swapping the AC powered sealed-unit for a DC powered battery-pack. This will enable all conventional nice looking AC power night lights to become battery powered night lights. Furthermore, it will be noted that the change to DC powered light devices enabled by the invention can be applied to all conventional low power consumption AC light devices because all such light sources use direct current to drive them and so one can use the interchangeable features of the invention for all light devices of all kinds of categories as long as they are low power consumption light devices as described above.

The invention thus provides an interchangeable power source for any lower power consumption light device, enabling the light device to utilize both an AC power source and a battery-operated power source.

BRIEF DESCRIPTION OF THE DRAWINGS

FIG. 3 shows a second preferred embodiment of an AC powered sealed-unit with a different geometric shape and different fixing means.

FIGS. 4, 5, 6, 5A and 5B show preferred LED light devices with including the AC powered sealed-unit of FIG. 3. All of these LED light devices also can have its own DC powered battery-pack to become a battery operated LED light device.

FIGS. 5C to 5F show a preferred LED battery operated light device with its own DC powered battery-pack with details of how to replace a battery, and in particular how easy to use the AC powered sealed-unit which meets all related safety standards to replace a DC powered battery-pack so as to cause the LED light device to become an AC powered LED light device for pretty products with no need to open other tooling to create the AC product.

FIGS. 5G and 5H show the most popular DC powered LED light device which has image projection or an LED touch light powered by DC current, and in which one can easily replace the DC powered battery-pack with an AC powered sealed-unit, resulting in very good items for a kid's room.

FIGS. 9 and 10 show details of the electric wall paper effects and arrangement of the embodiment of FIG. 7.

FIGS. 11, 12, 13, and 14 show alternative LED light devices with different light effects which also can use a DC battery-pack to replace an AC powered sealed-unit, the interchange enabling the light device to be placed in different locations for different applications.

DETAILED DESCRIPTION OF THE PREFERRED EMBODIMENTS

The current invention provides a light device with interchangeable power sources, which means that the light device may be powered by an AC powered sealed-unit or a DC battery-pack that fit into the light device and that can be replaced at any time. The light device may includes all kinds of low power consumption light sources, including but not limited to an LED, electro-luminescent (EL) element, organic EL, organic LED, or any other light source that can be turned on by three Duracell or similar alkaline batteries for up to one hour.

Furthermore, the light source utilized by the preferred embodiments can be arranged within the sealed-unit or battery-pack or the light source can be arranged within the light device and become a common light source to be used with either the sealed-unit or battery-pack, so that there is no light source on the sealed-unit and battery-pack. The light source for common use or individual light source within the sealed-unit or battery unit both fall within the current invention. The light source is not an expensive part so either arrangement is not a big issue.

Figure 15A:
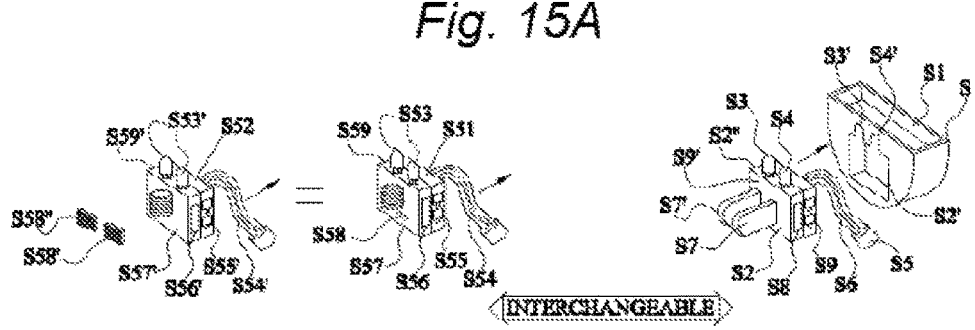
FIGS. 15A to 15C show an AC powered sealed-unit to fit into a compartment-means with a variety of installation means and construction of the sealed-unit, as well as a DC powered battery-pack to fit into the compartment to provide any LED light device with interchangeable power source features.
Figure 15B:
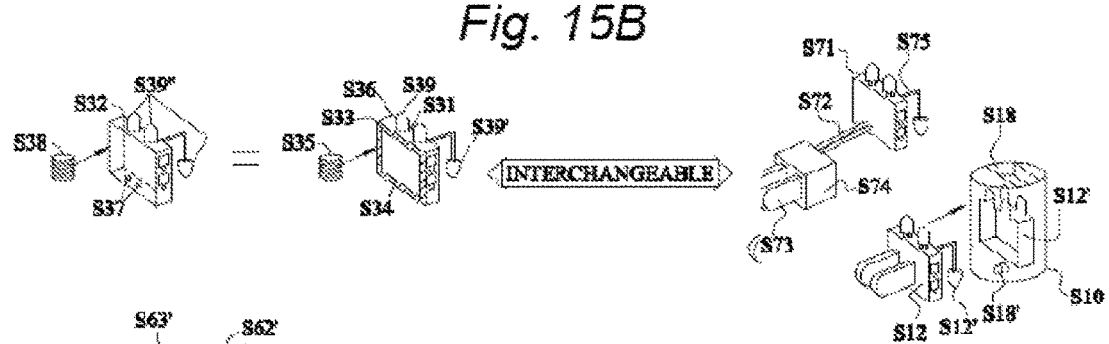
Figure 15C:
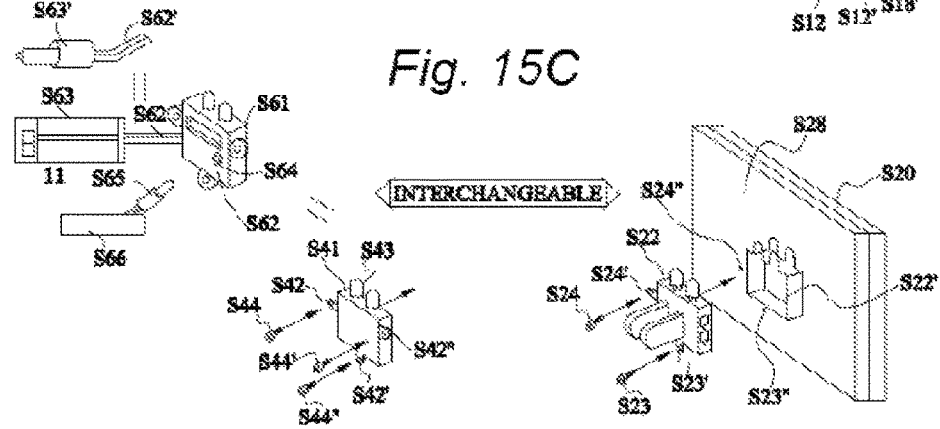

FIGS. 15A to 15C show a preferred light device including a housing-member (S1) with compartment-means (S2') that can receive an AC powered sealed-unit (S2") to cause a light source (S3) (S4) to be illuminated and seen by a viewer. The AC powered sealed-unit (S2") has a power-source (S7) (S7'), circuit means (S8), and light source (S3) (S4) within the sealed-unit (S2"). The sealed-unit (S2") also has assembly-means (S9) (S9') to make sure that assembly of the sealed-unit to the housing-member (S2") is very solid.

As shown in FIGS. 15A to 15C, the AC powered sealed-unit (S2") can be replaced by DC powered battery-packs (S51) (S52) which have light sources (S53) (S53'), power sources (S59) (S59'), circuit means (S56) (S56'), trigger means (S57) (S57'), and assembly-means (S55) (S55') within the battery-packs (S51) (S52) so that both battery-packs can replace the AC powered sealed-unit because the battery-packs s have the same size as the sealed unit to fit into the compartment-means (S2').

In the embodiment of FIGS. 15A to 15C, the first light device (S) can be any kind of low power consumption light source light device. It can provide front illumination, side illumination or any combination front, back, right, left, upper, and/or bottom side illumination to meet market requirements.

As shown in FIGS. 15A to 15C, the sealed-unit (S2") may also have connector-means with wire (S5) to connect with the remote light source. This is optional because some applications need such a sealed-unit (S71) with conductive-means (S72) to connect the AC outlet power source through the prong-means (S73) to the sealed-unit (S71). The same is true of the DC power-pack (S61), which may have conductive-means (S62) to provide electric signal delivery from outside power terminals for connection to an outside big battery-case (S63), charger, generator, solar module, wind power generator. The plug-means (S65) with conductive means can be plugged into a plug-receiving hole (S64) to easily make a connection.

As also shown in FIGS. 15A to 15C, light device (S10) has compartment-means (S12') to receive the sealed-unit (S12) or sealed-unit (S2"). The battery-pack (S31) (S32) can be replaced by the AC powered sealed-unit (S12) at any time according to the above discussion and the sealed-unit or battery-pack assembled to the housing-member (S10) by any conventionally available assembly-means (not shown).

FIGS. 15A to 15C also show a light device (S20) that has compartment-means (S22') to receive the sealed-unit (S22) or sealed-unit (S2"). The battery pack (S41) can replace the AC power sealed-unit (S22) at any time by screwing the screw-means (S23) (S24) into holes (S23') (S24') in the housing-member (S20) or by screwing the screw means (S44) (S44') (S44") into holes (S42) (S42') (S42") in the housing-member (S20).

According to FIGS. 15A to 15C, the AC powered sealed-unit (S2") (S71) (S12) has a quick connector (S5) or remote light source (S76) (S12') connected with the sealed-unit. This kind of electric arrangement is designed for a light source away from the sealed-unit body. At this date, an appropriate test laboratory such as Underwritters Laboratories Inc. (hereafter as UL) requires all remote low-voltage DC light sources and low voltage related conductive-means to be inside an anti-flammable enclosure (housing). However, the current inventor does not agree with this UL LED night regulation and believes UL will revise this unreasonable standard and allow the low voltage light source(s) and low voltage electric component(s) to be remote from the sealed-unit without any housing or enclosure to surround these parts. This aspect of the invention anticipates a more reasonable UL standard than new UL LED light standard 1786.

Finally, as shown in FIG. 15A to 15C, the light source (S76) is connected with the connect-means (S75) and may be a single LED, single EL element, or a printed circuit board (PCB) with a plurality of LED(s), as long as the sealed-unit output end has a low voltage electric signal output which cause no harm to people of any age. Hence, the light source (S5) (S76) (S12') and its related electric components have no need to be inside an anti-flammable housing or enclosure as required by the current UL LED light device standard and the common light source(s) can be installed inside the light device rather than inside the AC powered sealed-unit or DC powered battery-pack to save a lot of cost.

Figure 1:
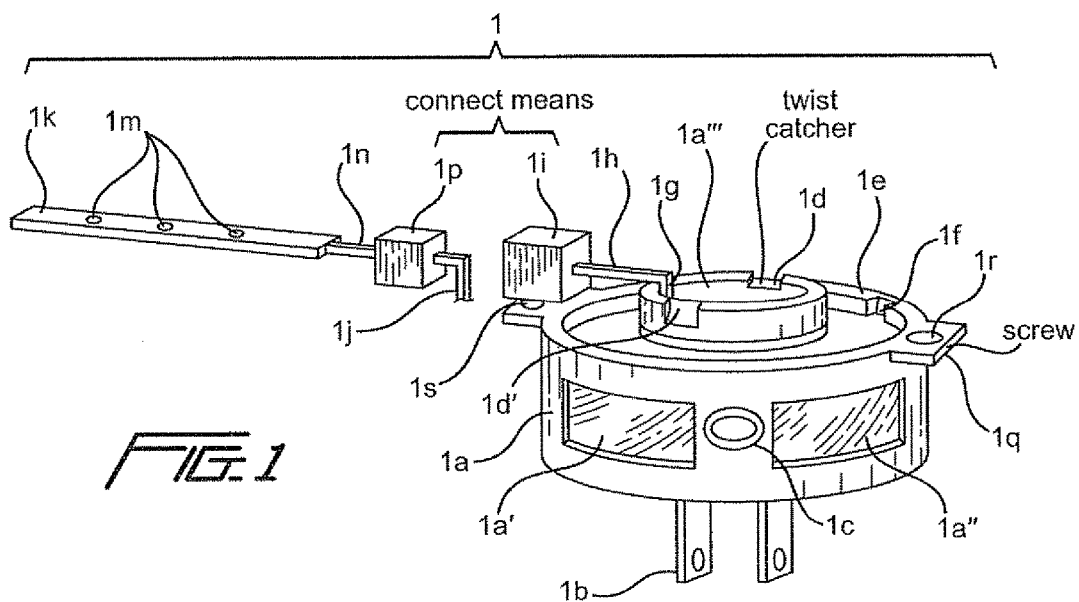
FIG. 1 shows a first preferred embodiment of an AC powered sealed-unit which has a cylinder shape with a variety windows to allow inner light beams to be emitted out to a viewer and fixing means to fix the sealed-unit on a main LED light device with trigger means and at least one quick connector to connect with remote LED parts.

FIG. 1 shows a first preferred embodiment of an AC powered sealed-unit (1a) having openings (1a') (1a'') (1a''') to allow an inner light source (not shown) to emit light from the top and sides of the sealed-unit to a viewer. The sealed unit has power source means (1b) to supply power to the inner circuit means (not shown) and the circuit means will be activated by the trigger means (1c) to cause the light source to turn on and off according to predetermined light functions, brightness, color, duration etc. The sealed-unit has assembly-means (1d) (1d') (1s) (1q) to assemble the sealed-unit to a main housing by a twist-catch or screw-fastening method, or any conventionally available skill for assembly.

The one extended conductive means (1h) passes through the hole (1g) to connect with quick connector female end (1i) which can connect with quick connector male end (1p). The quick connector can be replaced by any connector available from the marketplace, such as a pin, wire clip, solder, copper connectors, catch, etc., which are wide used on computers, consumer electric items, and communication items. The male end of the quick connector (1p) is connected with remote light source or light source set (1K) having a plurality of low power consumption light source(s) such as multiple LEDs, preferably on a circuit board (PCB) or flexible printed circuit board (FPC). Up until today, UL has required the light sources (1K) (1P) (1i) (1h) to be sealed inside the enclosure or housing, but the current inventor thinks that these light sources (1k) (1p) (1i) (1h) do not need to be sealed within an enclosure because they require only a low voltage and current. The inventor is the first to challenge the UL regulation and believes the safety regulation will change to accommodate the current invention design. The components (1K) and (1P) can be commonly used by the AC powered sealed-unit or DC powered battery-pack, which is a very important feature of this embodiment of the current invention. The connector-means (1p) and (1i) can be any kind of connector-means such as a quick connector with two conductive-means to deliver electric signals from the sealed-unit to the remote light source.

Figure 2:
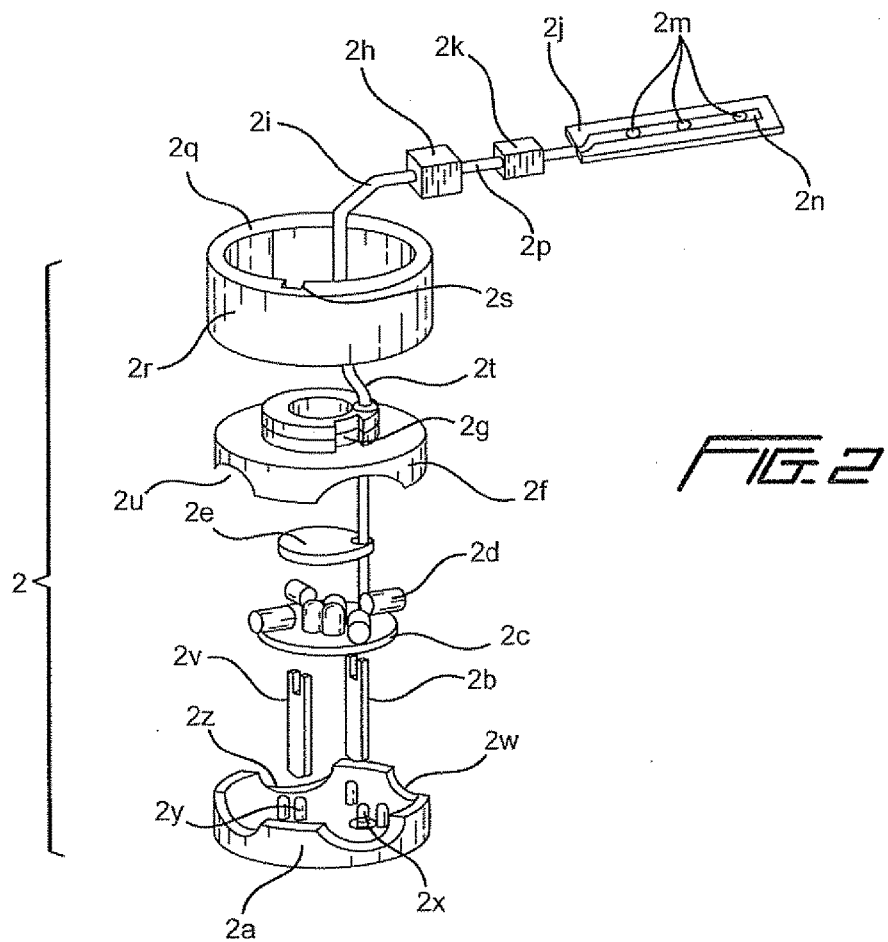
FIG. 2 shows details of the first preferred embodiment of the AC powered sealed-unit with cylinder shape illustrated in FIG. 1.
Figure 7:
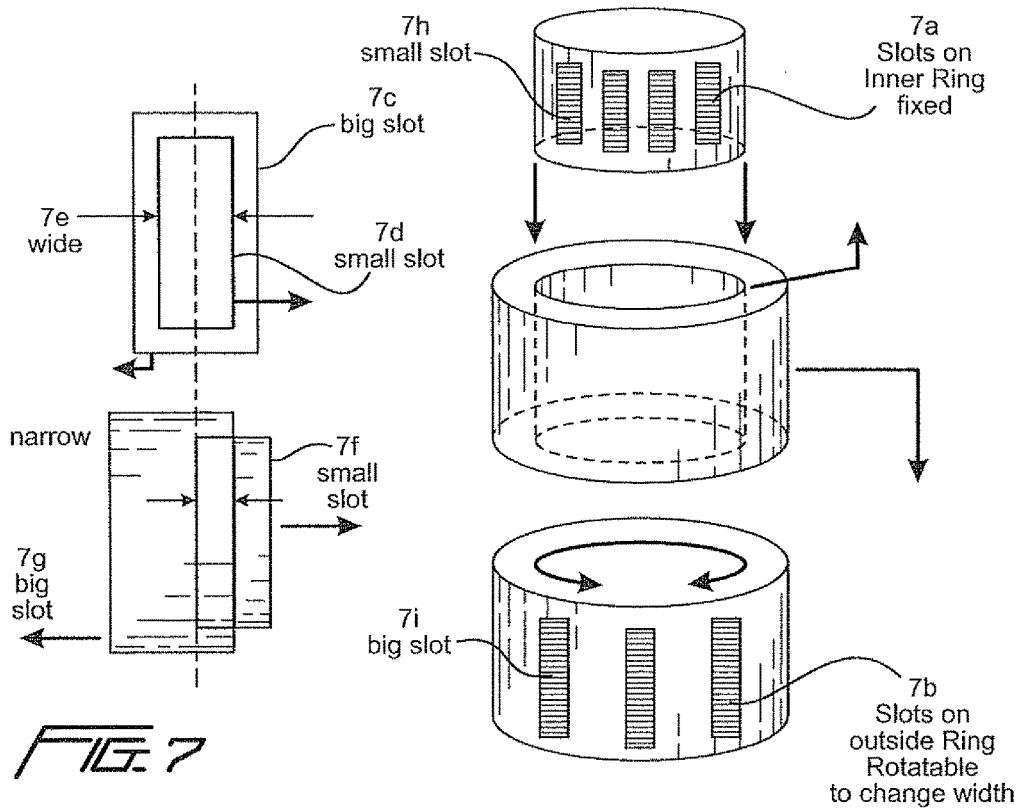
FIG. 7 shows a preferred AC powered sealed-unit with a changeable gap width so as to enable the LED light beams to pass through the housing to form different widths of light beam over 360 degrees to create a light beam wall paper with images that can be changed from wider to narrower to suit a person's temper or taste.
Figure 8:
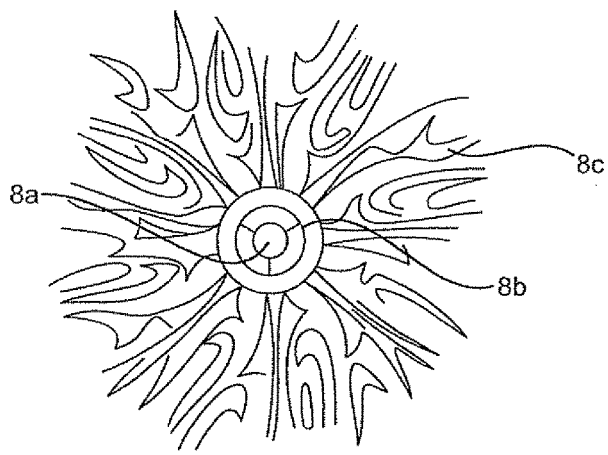
FIG. 8 shows an alternative to the sealed-unit of FIG. 7 for an LED light device that serves to provide electric wall paper in the form of pretty lines on walls, and that can be pre-designed to exhibit all kind of lines to create a variety of electric wall paper effects.

FIG. 2 shows a second preferred embodiment of an AC powered sealed-unit (2) which has the same construction as that of FIG. 1 but includes a plurality of openings, windows, r cut-outs with different geometric shapes. This exploded view shows all parts on each location of the cylindrical housing members (2a) (20 (2r), including prong means (2b) (2v), circuit means (2c), a plurality of light means (2d) (2d'), trigger means (not shown), a top lens (2e), cylinder lens (2r), assembly means (2g), extended conductive wire (2t), connector means (2h) (2k), and remote light set (2n) to provide the AC power sealed-unit with the best light performance. The top lens (2e) allows the inner light source to be seen on front of the prong. The cylinder lens (2r) prevents people from touching inner electric components inside openings (2Z), windows (2w), and cut-outs (2u), and can be translucent since the sealed-unit only needs front illumination. It also can be a transparent material for side illumination with pre-designed printing, masking, stenciling, and/or painting with art work so allow the light beams to spread out to all sides with special light effects such as the electric light wall paper shown in FIGS. 7, 8, 9, and 10. In a construction such as the one illustrated in FIG. 7, the center sealed-unit with a slot-shaped opening (7a) and outer cylinder lens has other slot openings (7b), and at least one of the slots can change position to change the gap width from narrow to wide and cause the light beam to be emitted out of different gaps to obtain the bright and dark stripe effect shown in FIGS. 9 and 10. This will result in a light image gap with changeable features. This kind of changeable image gap offers a variety of images for the electric wall paper, and will let people change the electric wall paper according to their moods or temper from time to time. The light device also can be changed back and forth from an AC power sealed-unit to a DC powered battery-pack to enable use in different locations such as a bedroom, bathroom, mobile home, RV, or camper to offer a very practical and useful low power consumption light device with image changeable dark and bright gaps. The up-grade model for electric wall paper not offers black and white images with different gap widths, but also can be designed with some art work on the outer geometric lens by painting, stencil, masking, a printing process, etc., to create an image such as the shown in FIG. 8 to provide nice and pretty electric wall paper effects. The light device (8a) is placed on a wall with the art designs on the outer geometric lens (8b) to project an electric wall paper with art-design (8c). This will save people a lot of money for regular painted wall paper. Furthermore, the current invention of electric wall paper effects also can apply to a lot of nicely shaped LED night lights, such as the ones shown in FIGS. 11 to 15, each of the LED night lights (11a) (12a) (13a) (14a) having an AC powered sealed-unit on its base and having a rotatable outer geometric lens (11b) (12b) (13d) (14c) (15a) (15b) (15c) with an art design. Not only can the AC powered sealed-unit create electric wall paper with pretty light effects, but also the top cover has openings (11e) (11f) (11g), windows (12d), and cut-outs (15d) (15e) (15f) (15g) to make light effects such as (13e) (14e) for top areas too. This is not an electric wall paper but will still offer very nice accent light effects to viewers.

In summary, FIGS. 1, 2, 7, 8, 9, 10, 11, 12, 13, 14, and 15 show light devices with the following features:

(1) Interchangeable power sources including an AC power source sealed-unit and a DC powered source battery-pack that can be interchanged at any time.

(2) A light source that can be installed within the light device and commonly used by the sealed-unit and battery-pack.

(3) An AC powered sealed-unit in a geometric shape with outer lens to create electric wall paper effects for geometric art projection to a wall or desired surface.

(4) An AC power source sealed-unit or light device housing-member having a plurality of openings, windows, or cut-outs to allow the inner light source(s) light to be emitted out to a viewer for a desired light performance and light effects.

(5) An AC power source sealed-unit with remote light source which does not need to be put into an enclosure to meet safety test laboratory standards, with electric signals instead being delivered from the sealed-unit to the remote light source by conventional connect-means.

As shown in FIG. 3, a preferred AC power source sealed-unit (3a) has a plurality of opening (3c), windows (3h) (3h') with assembly means (3d) (3d') (30 (3f) such as a twist-catch or screw-fastener for assembling the sealed unit to the light device. The sealed-unit has prong means (3b), circuit means (not shown), a plurality of light sources for different directions (corresponding to those disclosed in the inventor's U.S. Pat. No. 7,455,444), and trigger means (not shown). The opening (3c) allows light beams to be emitted through the front light device housing member. The plurality of windows (3h) (3h') may be in any geometric shape and size to allow the different orientation light source(s) to emit light in a variety directions to provide a light performance with predetermined light effects, color, illumination, brightness, dark areas, and/or art-design on a desired surface or area. The twist-catch (3d) (3d') can fit into all kinds of the light device's uniform housing compartment-means to fasten a sealed-unit tightly to the light device. The twist-catch (3d) (3d') can alternatively be replaced by any kind of assembly means such as a screw-fastener to perfectly assemble the AC power sealed-unit with the light device housing-member.

FIG. 4 shows a fourth preferred embodiment in the form of a light device (4) having a cover (4b) that can be rotated 360 degrees to cause the inner light source to emit light in any desired orientation at any time. The light device (4) is assembled with an AC powered sealed-unit (4a) by a twist-catch and the sealed-unit has its own power source (4c) (4c'), circuit means (not shown), and/or trigger means (always on or motion sensor), and uses a light source which is built into the said light device's (4) housing-member and connected with the sealed-unit. Hence, the sealed-unit (4a) does not need its own light source within the sealed-unit. This will enable the light device (4) to have the same light performance when replacing the AC power sealed-unit with a DC power battery-pack because the light source is always installed inside the light device's housing-member. This is different it's the arrangement disclosed in the inventor's prior applications which have their own light source(s) within each sealed-unit and battery-pack. As shown in FIG. 4, the light device is similar to a marketplace rotating night light.

FIG. 5 shows a fifth preferred embodiment of a light device (5) having an AC powered sealed-unit (5a) assembled with light device by fixing-means such as a screw-fastener, twist-catch, press fit, snap fit, catch, hook and loop, magnet, or any other fixing means with equivalent functions. The sealed-unit (5a) may have its own light source built within the sealed-unit for illuminating four sides. In that case, light beams from the light device could be seen by a viewer in five directions. The said light device (5) also has uniform compartment-means to receive the AC power sealed-unit and DC power battery-pack. The housing of the AC power sealed-unit and DC power battery-pack has its own dimension so long as ends of the housing are uniform and able to fit within the uniform compartment-means. The rest of the areas of said sealed-unit or battery-pack can be any geometric design to meet market requirement as long as the uniform-end can fit into the light device's uniform receiving compartment-means.

The sealed-unit (5a) has a power source (5d), fixing means, circuit means, trigger means (auto-photo sensor), sensor means (5e), on four sides, a plurality of light source(s) to provide four-side illumination. The light device (5) has at least one light source installed within its housing (5c) to provide illumination on top of the light device. This fifth embodiment has a prong means (5d) on side of the light device which is different the prong means (4c) (4c') of the fourth embodiment, which are on the bottom of the light device (4). The light device of FIG. 5 is similar to a conventional "jewel" night light.

As shown in FIG. 6, the light device (6) has a sealed-unit (6a) assembled with the light device (6) by screw-fastener means. The light device (6) has housing members (6e) (6d) to similar to those of a marketplace guide light. The sealed-unit has prong means (6b) on one side of the sealed-unit and manual switch means to cause an inner circuit to be activated to turn on the light device for illumination.

FIG. 5A shows a light device (16AA) having a plurality of LEDs (16-3) (16-3') (16-3") installed on conductive means (16-2) from top to bottom, each LED emitting light to laser elements to create laser images (16-4) (16-4') (16-4") on a laser material balloon. The conductive means (16-2) fit into a central channel (16-1) of a laser material balloon and the balloon is filled up with air to form a cone shape. The balloon is weighted by the lower AC powered sealed unit (16-7) which has a plug means (16-8) and trigger means (16-10) remote from the sealed-unit. A plurality of light source LEDs (16-3) (16-3') (16-3") also are positioned remotely from the sealed-unit of this preferred embodiment. The conductive means (16-2) are in a rigid printed circuit board that easily fits into the central channel (16-1) to install the LEDs in a perfect arrangement. The AC power sealed-unit also can be replaced by a DC power battery-pack on the bottom of the laser material balloon light device (16AA).

FIG. 5B shows a light device (16BB) which has an AC power sealed-unit (16a-1) including prong means (16a-2), trigger means (16a-3), a light source (not shown), and circuit means (not shown). The AC power sealed-unit also includes assembly-means (not shown) to provide a top laser-material gift box (16a-7) with a ribbon (16a-5) and tie (16a-4). When the light source is turned on, the light source will create a laser star image on the laser material gift box shade. The laser-material gift box shade also can fit a DC power battery-pack into the bottom uniform compartment-means and assembly-means to change the AC powered light device into a DC powered battery-pack light device as described above.

FIG. 5C shows a traditional LED light device (53) for a kids' toy with a DC power battery-pack (53g), a plurality of LED light sources (53e) inside the LED light device (53), and trigger-means with two conductive-touch ends (53h). The light source (53e) and battery-pack (53g) deliver electric signals via connect-means (53i). The light source (53e) is arranged inside the light device space which is remote from the battery-pack (53g) and connected with battery-pack (53g) by conventional connect-means (53i). As shown in FIG. 5-4, the battery-pack may be replaced by an AC power sealed-unit (54d) that uses the same connect-means (53i) to deliver the electric signals from the sealed-unit (54e) to the light source (54c). The sealed-unit (54d) has its own AC power source from the prong means (54e).

FIGS. 5C and 5D show a typical interchange of the AC power sealed-unit and battery-pack with respect to the uniform connect-means and uniform compartment-means of the light device.

FIG. 5E shows the uniform compartment-means (55b) and two conductive-ends (55d) (55e) of FIG. 5C with a battery-pack (55c) fitted into the uniform compartment-means (55b). The AC sealed-unit (not shown) also can fit into this uniform compartment-means (55b).

FIG. 5F shows construction details for the battery-pack of FIG. 5C. The plurality of batteries (56g) fit into the battery space (56h) in the battery pack (56f) to fit into the uniform compartment-means (56i) of the light device (56). The two conductive-ends (56c) (56c') act as trigger means. The screw hole (56d) serves as an assembly-means to assemble the battery-pack or sealed-unit to the light device.

FIG. 5G shows a popular kids' LED projection light device (57) including a battery-pack (57g) that fits into the light device (57) with a trigger means and circuit means to cause the LED to emit light through the slide (57e) and project the slide image to a desired surface. The slide can be changed by rotating the slide-disc (57d) located on the base (57c) of the light device. The battery pack can also be replaced by an AC power sealed-unit and powered by an AC power source.

FIG. 5H shows a kids' LED flashlight with characters design of the type sold at a playground. A battery-pack provides a DC power source (58C) with a cover (58d) to fit into a uniform compartment-means (58e). The battery-pack (58c) and its circuit and trigger means can be replaced by an AC power sealed-unit to make this kids' flash light into an AC powered flash light when connected with an outlet by prong means or plug means remote from the sealed unit.

FIGS. 7, 8, 9, 10, 11, 12, 13, and 14 may utilize the construction discussed above in connection with FIG. 2.

FIGS. 9 and 10 show preferred embodiments of a LED light device (9a) having prong means, circuit means, and an LED or LEDs arranged inside the main housing, which has a transparent cover to transmit light beams from the inner LED/LEDs.

The LED/LEDs shown in FIGS. 9 and 10 can be arranged to emit light inwardly or outwardly so as to be visible over angles ranging from 30 degree to 360 degree. For example, to get 360 degree illumination on a wall, one may use three LEDs each having a 120 degree of light emitting angle and arrange the three LEDs on the edge of the maximum distance to the center of circuit board, so that each 120 degree LED's light beam is emitted through the center to the opposite edge and provides illumination over the resulting 120 degree arc. If one puts the 120 degree viewing angle LED on the edge and emit light outwardly, however, the LED will not cover a 120 degree angle of the front cover, shade, screen, opening, cut-outs, grill, or holes because the distance from the LED to the front cover, shade, screen, opening, cut-outs, grill, holes is too close so the function of the front cover, shade, screen, opening, cut-outs, grill, or holes is useless and the special geometric art's light patterns cannot be created. In order to get 360 degree electric Wall-Paper light performance, at least three LEDs need to be installed on the edge of the circuit-board and each LED must face inwardly to provide enough distance from the LEDs to the front cover, shade, screen, opening, cut-outs, grill, or holes so as to use the front cover, shade, screen, opening, cut-outs, grill, or holes to provide a good light block and through passage to project the geometric art on the wall. FIGS. 9 and 10 show the special light performance for the current invention. It is important to prevent people from touching the electric components so a transparent cover is needed to cover all said LED or LEDs inside. Other units without this transparent cover are not safe at all.

Some geometric art light performances may not require the front cover, shade, screen, opening, cut-outs, grill, or holes because the LED itself has it's a shape which can create a "V" shape super bright light pattern on four sides.

In order to get a 360 degree geometric art light performance with all of the LEDs arranged emit light inwardly, so the LEDs' height must be the highest of all other electric components so that the light beams can been seen.

The main-housing can be connected with the front cover, shade, screen, opening, cut-outs, grill, or holes by conventional assembly means as illustrated in FIG. 3 (3d) (3d'), FIG. 4 (twist catch), FIG. 5 (fixing means), or FIG. 6 (screw). All these assembly means are available from the conventional market and skill to attach the main-housing to another front body, which is optionally used to provide a desired geometric art light performance as discussed above.

The front body shown in FIG. 9 may be made up of several pieces such as an opaque lens (9d), grill (9b) (9b') (9b"), or opening (9c) (9c') (9c"). The light will be blocked by the grills (9b) (9b') (9b") and pass through openings (9c) (9c') (9c"). Any kind of arrangement to block the light beams and let light beams pass therethrough will still fall within the scope of the current invention skill including any desired combination of grill, openings, cut-outs, stencil, film, electric components' screen, slide, textile, fabric material, plastic piece, metal piece, wooden piece, paper piece, and holes. This is very unique to the current invention and is possible because the main-housing unit for the interchangeable power source universal unit has its own laboratory test report with its own safety certification so that any front body can be added to the universal unit of the current invention. Even a tissue paper front body on the universal unit would still fall within the safety regulation.

Hence, the special light performance LED light device of the current invention is very good because it can create an electric wall paper or other geometric art performance in a very simple manner, so that LED lighting is no longer just for illumination but also has its decorative value too.

Examples of a suitable "sealed-unit," in which all electric components of the light device may be fitted, are disclosed in the inventor's above-cited U.S. patent application Ser. Nos. 12/527,631; 11/498,881; 11/255,981; and 11/094,215.

The "sealed-unit" has its own power, LED, circuit-means, and attachment means so that it can fit into any LED light housing as long as the housing has a uniform compartment. The "AC powered sealed unit" can use a 110 Volt 60 Hz or other high voltage connection arranged to meet all safety standards without any hazard of short circuits or potential damage during laboratory tests and procedures related to safety certification.

The uniform compartment of the LED light housing has a construction and dimensions that enable the "sealed-unit" to easily fit into the compartment. The current invention further includes a "DC battery-pack" which has its own outside dimensions similar to those of the "sealed unit" to also fit into the "uniform compartment." The "DC powered battery-pack" can replace the "AC powered sealed-unit" at any time because both have their own power, LED (optionally), circuit-means, and attachment means to fit into the same LED light housing as long as the housing has a uniform compartment.

The current invention provides an LED light that can change its power source from AC to DC or DC to AC. This is a further improvement of the "AC power sealed-unit" described in the co-pending patent applications listed above, which saves a lot of tooling for different shaped LED lights and also saves a lot of laboratory testing expense and time. Furthermore, the interchangeable power source also can save a lot of tooling costs, time, and labor to provide a good LED light having a pinhole-imaging function (or functions of other LED lighting fixtures, laser LED light devices, etc.) with a same nice shape but with different power sources to enable the light to be used in different locations where people stay. This is one of the advantageous features of the current invention. Not only does the invention apply to all different shapes of LED night light, but also enables a traditional puck light powered by a DC battery to also be powered by AC so long as people pay for extra parts to hang the traditional puck light on an AC outlet.

While the above-discussed preferred embodiments show the scope of the current invention, it is to be appreciated that any alternative or equivalent design, construction, modification, up-grade, and so forth will still fall within the scope of the invention, which is not limited to the above discussed or mentioned details. Any alternative or equivalent arrangement, process, installation or the like may still fall within the scope of the current invention, including variations in the power source, conductive means, geometric shape of LED-units, connector-means, circuit means, sensor means, switch means, LED elements, attachment means, fixing-means, tightening means, and/or resilient conductive means.

I claim:

1. An LED light device having a surrounding geometric lighted pattern, comprising:
    at least one housing having a light-passing area through which LED light beams pass to create said lighted pattern exclusively on a wall surface on which the LED light device is situated and wherein the lighted pattern surrounds the LED light device;
    at least one LED; and
    circuitry to supply DC power current to the at least one LED to cause the at least one LED to turn on and off and emit light beams to achieve predetermined lighting effects and form said lighted pattern,
    wherein said at least one LED is within said housing, and light beams pass through the light passing area of the housing,
    wherein said light passing area incorporates at least one light pattern forming structure and/or arrangement to cause the geometric lighted pattern to surround said LED light device on said wall surface or wall to which the housing is secured, and
    wherein said light pattern forming structure and/or arrangement is one of (a) an area having a plurality of openings and/or cut-outs, (b) an area having at least one grill, (c) an area having at least one window, printing, silkscreening, added films, and/or optical films, (d) an area having pieces with texturing, (e) an area having pieces with variable thicknesses, and (f) an area having pieces with holes, windows, and/or printing distributed at least partially on the housing so that the light passing therethrough forms said geometric lighted pattern.

2. An LED light device having a geometric lighted pattern as claimed in claim 1, including a plurality of LEDs installed at different locations inside a sealed unit, said plurality of LEDs having different colors, different light emitting directions, different brightnesses, and/or different turn on and turn off timing, duration, and functions.

3. An LED light device having a geometric light pattern as claimed in claim 1, wherein a color, size, shape, and distance of said light patterns is determined by a design of the light pattern forming structures, and/or an arrangement of the at least one LED, and/or control by an integrated circuit chip, circuitry, and/or a controller.

4. An LED light device having a geometric lighted pattern as claimed in claim 1, further comprising at least one integrated circuit to cause multiple LEDs to have different turn on and turn off times, duty cycles, color changing, effects, or performance.

5. An LED light device having a geometric lighted pattern as claimed in claim 1, wherein the LED light device is a plug-in AC light device.

6. An LED light device having a geometric lighted pattern as claimed in claim 1, wherein the LED light device is a DC powered light device.

7. An LED light device having a geometric lighted pattern as claimed in claim 1, wherein the LED device provides a light performance having at least one of the following features: more than one color of lighted pattern, more than one shape of lighted pattern, more than one distance or spacing of lighted pattern, more than one LED light function, more than one light effect and/or more than one lighted pattern.

8. An LED light device having a geometric lighted pattern as claimed in claim 1, wherein the light performance spreads lighted art to a surrounding surface having a predetermined size and shape.

9. An LED light device for forming lighted geometric-art patterns on a wall and for providing illumination, including;
    at least one housing mounted on the wall and having at least one LED, a circuit, a sensor or switch, and prongs to connect to a wall outlet to obtain power to turn on and turn off the LEDs to achieve predetermined light effects and functions, wherein the at least one LED is arranged to be within the housing at a top, center, or lower position to cause light beams to be emitted through the housing and lighted geometric-art patterns to be shown exclusively on the wall and surrounding the LED light device,
    wherein the at least one LED is sealed within the housing to transmit the light beams in any desired direction, the lighted geometric-art patterns being formed by at least one of (a) an added-on piece that provides changeable lighted patterns upon changing and/or moving the added-on piece, and/or that incorporates circuitry with at least one controller, and (b) a predetermined area of the housing area having texture, characters, colors, printing, window, cutouts, stencils, or printed film, to create the geometric-art patterns,
    wherein the at least one LED is installed to at a predetermined height or location to prevent other electric components from blocking a light beam traveling path inside the housing inner space, and
    wherein the circuit includes electric parts and accessories for changing an input 120 Volt AC current to DC current for operating the LEDs.

10. An LED light device for forming lighted geometric-art patterns that surround the LED light device, including:
    a plurality of LEDs that are arranged on a wall surface to cause lighted patterns to been seen by a viewer exclusively on the wall surface that partially or wholly surrounds the LED light device over an angle between 100 and 360 degrees;
    a power supply circuit for providing power from a power source to the plurality of LEDs, said power supply circuit being sealed within a housing;
    at least one added-on front body including: (a) movable light-blocking and/or light-transmitting structures, or (b) an added piece with texture, a film or slide with characters, or a piece with colors, or (c) a printed film, to create the geometric-art patterns as the light beams pass through the housing and/or the front body and/or the added piece,
    wherein the LED light device offers lighted geometric-art patterns on a wall the power source for the LED light device being a DC power source or an AC plug-in power source.

11. An LED light device for forming lighted geometric-art patterns surrounding the LED light device on a wall as claimed in claim 10, wherein the LED light includes a top partially spherical cover attached to the added-on front body for causing light beams to spread out from the housing for illumination, wherein the top partially spherical cover includes at least one light pattern forming structure selected from a piece with a plurality of openings, a piece with cut-outs, at least one grill piece, at least one window piece, a printed piece, a silk-screened piece, added films, optical films, a piece with texturing, a piece with variable thicknesses, and holes distributed at least partially around the main housing to form said lighted geometric-art patterns.

* * * * *